United States Patent [19]
Stevens

[11] 3,798,845
[45] Mar. 26, 1974

[54] GRINDING WHEEL TRUING CONTROL APPARATUS

[75] Inventor: Thomas F. Stevens, Shrewsbury, Mass.

[73] Assignee: The Warner & Swasey Company, Cleveland, Ohio

[22] Filed: Sept. 24, 1971

[21] Appl. No.: 183,359

[52] U.S. Cl. ............................................ 51/165.87
[51] Int. Cl. ........................................... B24b 49/18
[58] Field of Search ................. 51/5, 165.87, 165.88

[56] References Cited
UNITED STATES PATENTS

| | | | |
|---|---|---|---|
| 2,946,162 | 7/1960 | Mader | 51/165.88 |
| 3,561,164 | 2/1971 | Dunn | 51/165.87 |
| 3,634,977 | 1/1972 | Bunting | 51/165.87 |
| 3,590,534 | 7/1971 | Snyder | 51/165.88 |

*Primary Examiner*—Harold D. Whitehead

[57] ABSTRACT

Apparatus and method for automatically increasing and determining the frequency of truing a grinding wheel in a grinding machine having means for compensating for the reduction in radius of the grinding wheel and to advance the grinding wheel to maintain the retracted position of the cutting face of the grinding wheel at a predetermined substantially constant distance from the work support means. Truing control means are provided for counting the workpieces being ground and initiating the truing means, and sensing means responsive to the amount of compensating movement to periodically produce and send an additional count to the counting means whereby the predetermined number of counts for which the counting means has been preset to initiate a truing cycle is reached prior to grinding the preset number of workpieces. Thus the number of workpieces ground by the wheel is periodically decreased in direct proportion to the reduction in the radius of the grinding wheel.

9 Claims, 1 Drawing Figure

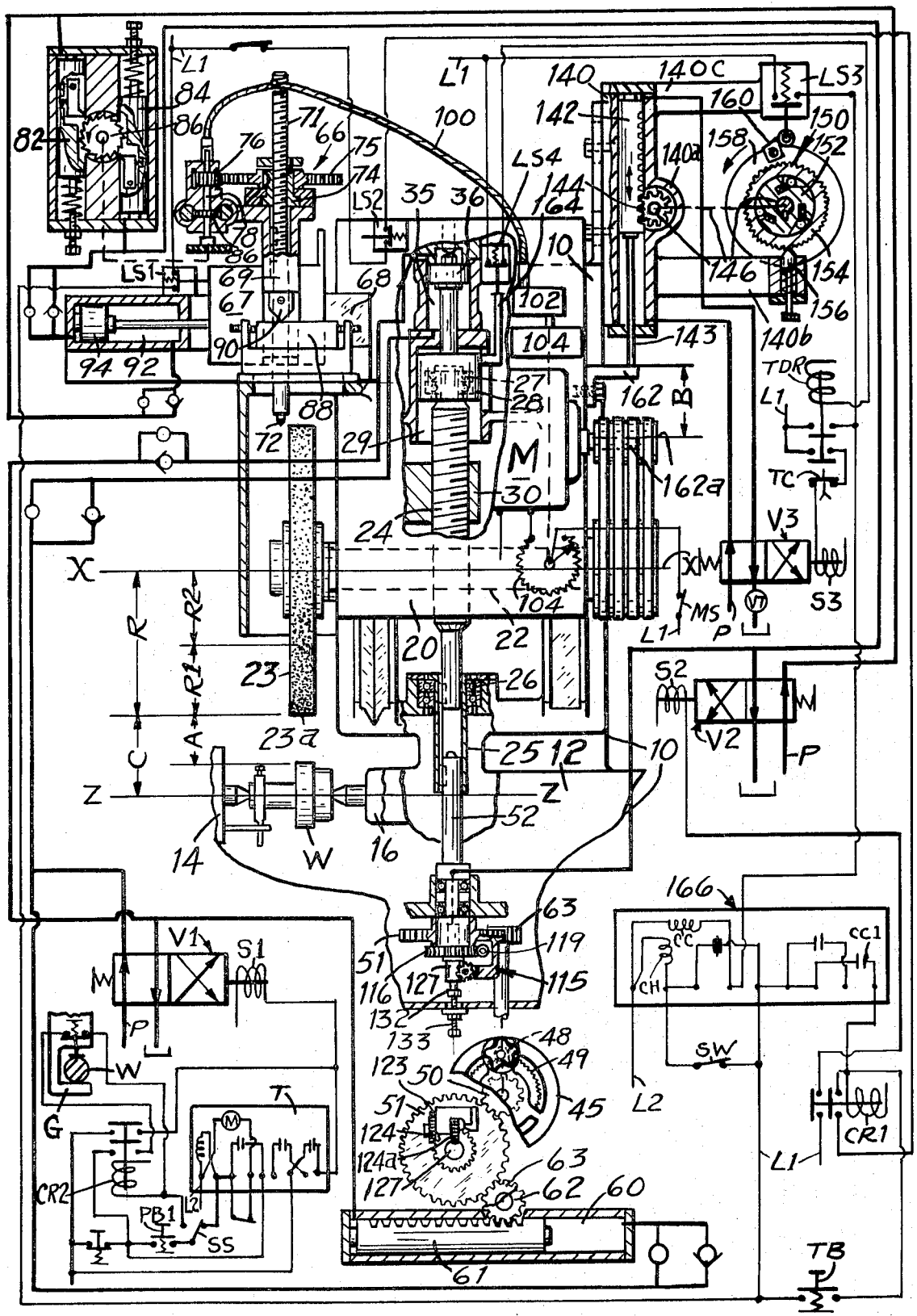

GRINDING WHEEL TRUING CONTROL APPARATUS

BACKGROUND OF THE INVENTION

1. Field of the Invention

The invention relates to grinding machines and particularly to apparatus and method for truing a grinding wheel at a progressively increasing frequency as it is progressively reduced in diameter.

2. Description of the Prior Art

It is known that the maximum number of workpieces which can be ground satisfactorily before the grinding wheel needs to be retrued or redressed diminishes as the diameter and life of the grinding wheel decreases. This occurs because as the diameter and hence the circumference of the wheel decreases, it requires more revolutions or rotation of the smaller diameter grinding wheel to present the same amount of abrasive cutting surface as the larger diameter of the wheel presented previously to grind an identical workpiece to size. Consequently, the demand on the cutting surface increases causing the wheel to become dull sooner relative to the number of workpieces ground. In order to maintain production rates a variety of prior art constant peripheral wheel speed devices were utilized to automatically increase the speed of the wheel drive motor and rate of rotation as the grinding wheel diameter decreased, and maintaining a predetermined constant amount or number of surface feet per minute of the wheels cutting surface available to grind the workpiece.

More recently wheel speeds and hence constant peripheral surface speeds have been greatly increased. As a result, the grinding wheel dulls even sooner and is usually trued automatically after a predetermined number of workpieces have been ground. The number of workpieces which the grinding wheel is to grind between dressings is predetermined and usually remains constant throughout the life of the wheel. Often the number selected is based on a known quantity of pieces that have been satisfactorily ground with an identical wheel at its minimum usable diameter. Thus, one can be reasonably assured that the grinding wheel is kept sharp and the workpieces ground by and during the life of that particular wheel will be acceptable.

The applicants invention differs from the prior art in that it utilizes the available cutting surface of the wheel regardless of its diameter to substantially the fullest extent and grinds the maximum number of workpieces that it is capable of between truing cycles. Hence a wheel trued by the applicant's invention is conserved, will not increase the grinding cycle, will be kept sharp, and produce more workpieces during its life than an identical wheel consistently dressed after a given number of workpieces are ground.

There have been various truing systems devised which true less off the wheel by either more frequent intermittent or continuous dressing of the grinding wheel without interrupting the grinding cycle. However, the more frequent and continuous truing cycles are not always advantages and are wasteful. The time saved during the grinding cycle is offset by having to replace the grinding wheel more frequently.

In U. S. Pat. No. 3,033,187 issued on May 8, 1962 to Wespi there is disclosed a sensing device which directly engages the cutting surface to determine the radius, diameter, and circumference of the grinding wheel after each truing cycle. The sensing device is operatively connected to be operated concurrently with a wheel compensating device, such as disclosed hereinafter by the applicant, to advance the grinding wheel and its support by the amount the wheel is reduced in radius. Both the sensing device and the grinding wheel are simultaneously advanced equal amounts until the sensing device engages the cutting surface of the wheel whereupon the compensating movement is terminated and the sensing device retracted. Although the sensing device of Wespi is similar in some respects to the applicants sensing device it serves an entirely different purpose than the applicant's invention. Wespi discloses a sensing device having a stylus which is subject to wear by the engagement with the abrasive wheel and which is used for the purpose of compensating a wheel feed mechanism for reduction in the size of the wheel due to wheel and truing tool wear. The applicant's sensing device does not engage the abrasive cutting surface of the wheel but instead is responsive to the compensating movement of the wheel support which is utilized for the purpose of determining the frequency of truing the cutting surface of the wheel and periodically reducing the number of workpieces ground between dressings in direct proportion to the reduction in radius and circumference of the wheel by the truing device. In fact that applicant's invention could be used in combination with the wheel wear sensing device and compensator disclosed by Wespi.

SUMMARY OF THE INVENTION

A grinding machine comprising a base and a relatively movable wheel slide on which is mounted for movement therewith a rotatably driven grinding wheel, and means for truing the peripheral surface of the grinding wheel. A wheel feed mechanism is provided for moving the grinding wheel toward and away from means for supporting a workpiece. There is a wheel feed compensating mechanism for actuating the wheel feed mechanism so that it advances the wheel slide and the grinding wheel relative to the base and the work support means by the amount the grinding wheel radius is reduced by the truing means. Not necessary, but preferably there are means for maintaining a constant peripheral speed of the grinding wheels cutting surface. The improvement comprises truing control means, including a counter, actuated each time a workpiece is ground and sensing means including a cylinder with a cam rack piston therein engaged by a pinion gear actuated each time the wheel is in a retracted position. The cylinder is fixed relative to the wheel slide and the rack piston is advanced, relative to the cylinder, until it engages a stop on or fixed to and movable with the wheel slide. The distance between the end of the rack piston and the stop is equal to the total increments trued off the wheel and ranges from zero, with a new wheel, to the maximum usable radial portion of the wheel equal to the difference between the maximum and minimum radius thereof.

Each forward stroke of the rack piston partially rotates the pinion gear, a shaft, and a one way clutch adapted to incrementally rotate a cam in one direction relative to a switch. After a number of angular displacements of the cam the switch is actuated thereby and sends an additional false signal to the workpiece counting means which initiates a truing cycle when it receives the predetermined total number of counts for which it was initially preset. As the radius of the grinding wheel is progressively reduced and compensated for the stroke of the rack piston and the angular displacements of the cam are progressively increased. Hence the switch is actuated more frequently and sending a progressively increasing number of additional false signals whereby the truing frequency of the wheel is progressively increased in accordance with the progressively decreasing radius of the wheel. The circumference of the pitch circle of pinion gear is equal to the radial length of the usable radial portion of a new full size wheel.

Therefore, it is the primary object of the invention to provide an apparatus for progressively increasing and determining the frequency of truing a grinding wheel in accordance with its progressively decreasing radius and number of workpieces which it is capable of grinding.

BRIEF DESCRIPTION OF THE DRAWINGS

The drawing is a diagrammatic view showing the invention and various portions, controls, and mechanisms of a grinding machine with which it is associated.

DESCRIPTION OF THE PREFERRED EMBODIMENTS

In the drawing is shown, by way of example, portions of a typical grinding machine is combination with which the applicants invention will be described. Portions of the grinding machine shown are similar to those disclosed and referred to in U. S. Pat. No. 2,894,360 issued July 14, 1959 to Alvord and to which reference may be had for details not described herein.

The grinding machine usually comprises a base 10 on which is mounted a work support table 12. On the table 12 is mounted the customary means for rotatably driving and supporting a workpiece W, and may comprise a headstock 14 and preferably, but not necessarily, a footstock 16 having centers between which the workpiece W to be ground is held. The base 10 also supports a transversely movable wheel support or slide 20 arranged to slide transversely on a V-way and a flat-way. A wheel spindle 22 is rotatably supported in the wheel slide 20 and on one end of which is mounted for rotation therewith a grinding wheel 23 with a peripheral or circumferential cutting face 23a about the center axis of the wheel.

Wheel drive means which may comprise a wheel drive motor M mounted on the wheel slide 20, and connected by a conventional pulley and belt drive system to the wheel spindle 22, is provided for driving the grinding wheel.

Means for feeding the wheel slide and the grinding wheel toward and away from the workpiece is provided which may be, if desired, similar to the wheel feed mechanism disclosed in the United States Patent referred to above. The wheel feed mechanism shown may comprise a rotatable feed screw 24 journalled for axial and rotatable movement relative to the base 10. A forward end of the screw is slidably keyed to a rotatable sleeve or coupling 25 journalled in bearings 26. The opposite or rear end of the feed screw 24 is journalled in bearings 27 in a cylindrical sleeve 28 slidably mounted within a cylinder bore of a cylinder 29 fixed relative to the base 10. The feed screw engages and meshes with a feed nut 30 fixed to and depending from the wheel slide 20 which move together upon rotation of the screw 24.

A fluid operated mechanism is provided for imparting a rapid axial transverse feeding movement to the feed screw 24, sleeve 28, the wheel slide 20, and the grinding wheel 23 toward and away from the workpiece W. This mechanism comprises a rapid transverse cylinder 35 fixed to the base 10 in axial alignment with the cylinder 29 and the feed screw 24. Slidable, a predetermined amount, in the cylinder 35 is a rapid traverse piston 36 connected by a piston rod to the cylindrical sleeve 28 in the cylinder 29. The rapid traverse movement of the piston 36 and hence the wheel is substantially a constant amount and the forward and retracted positions of the piston 36 are determined by engaging the end walls of the cylinder 35.

The wheel feed means may further comprise an optionally manual or fluid actuated slow or body feed mechanism for rotating the feed screw 24 relative to feed nut 30. An adjustable hand feed wheel 45 with an abutment for engaging a positive stop is operably connected to the feed screw 24 through a train of gears 48, 49, 50, and 51, to a shaft 52 keyed to the sleeve or coupling 25. A fluid pressure cylinder 60 has a rack piston 61 slidable therein engaging a rotatable gear 62 operatively connected through a clutch mechanism, not shown, to rotate the gears 63, 51, shaft 52, coupling 25 and the feed screw 24.

A solenoid operated directional control valve V1 is provided for directing fluid under pressure to and from opposite ends of the rapid traverse cylinder 35 and the slow or body feed cylinder 60. Upon energizing a solenoid S1 the valve V1 directs fluid to advance the wheel slide and the grinding wheel to grind the workpiece to size under the control of either a timer T or an in-process gage G in the well known manner. Both the timer T and the gage G may be of any suitable conventional commercially available type well known in the art.

When a selector switch SS is in the position shown the grinding machine cycle is under the control of the timer T which is energized by momentarily closing a switch PB1. The timer T closes a holding circuit to energize and maintain S1 energized until it times out. Shifting the selector switch SS from the position shown to the gage circuit contact places the grinding machine cycle under the control of a conventional commercially available in-process gage, such as, those manufactured by Federal Gage Company of Providence, Rhode Island. Upon actuating PB1 a relay CR2 is energized closing its normally open contacts one set of which energizes the solenoid S1. The other set of contacts are connected in series with a set of closed contacts of the in-process gage G to set up holding circuit maintaining S1 energized until the contacts of the gage are opened when the workpiece has been ground to final size in the well known manner.

Means for truing the cutting surface 23a of the grinding wheel 23 are provided and may include any one of a number of suitable dressing or truing devices well known in the art. For example, the truing apparatus may be one which trues or dresses either a straight, or a contoured peripheral cutting surface on the grinding wheel 23. The truing or dressing device shown, in simplified form, is similar to and may be any one or a modified form of any one of those disclosed in U. S. Pat. Nos. 2,647,504 and 2,900,974 to Hill dated Aug. 4 and Aug. 25, 1969 respectively and U.S. Pat. No. 2,746,214 to Alvord dated May 22, 1956 to which references may be had for details not disclosed herein.

The truing or dressing device 66 is mounted on and movable with the wheel slide 20 and comprises a longitudinally traversable movable slide 67 movable relative to a slideway 68 fixed relative to the wheel slide 20 and the grinding wheel 23. The longitudinal slide 67 has a transverse slideway thereon and serves as a support for a transversely movable truing tool slide 69 movable toward and away from the axis X—X of rotation of the grinding wheel 23 and the splindle 22. Slidably keyed within the tool slide 69 is a truing tool spindle or feed screw 71 with a truing tool 72 at one end thereof adjacent the grinding wheel face 23a. The upper or opposite end portion of the truing tool spindle 71 has a threaded portion which meshes with a rotatable feed nut 74 fixed against axial movement. The nut 74 is keyed to a driven feed gear 75 meshing with a pinion drive gear 76 fixed to a pinion drive shaft 78 of a fluid operated ratchet type truing tool feed mechanism 80 similar to that shown in U. S. Pat. No. 2,900,974 referred to above.

The truing tool feed mechanism comprises a pair of alternately actuated pawl and ratchet pistons 82 and 84 slidable within a pair of cylinders fixed relative to the truing tool slide 69. Each pawl and ratchet piston has a predetermined adjustable stroke and rotates a ratchet wheel 86, and the pinion drive shaft 78, fixed thereto in one direction to feed the truing tool a predetermined increment toward the axis of rotation X—X of the wheel 23 and spindle 22.

The truing device is provided with a form bar 88 fixed relative to and adjacent to the slideway 68. On the form bar 88 is a plane or straight operative surface engaging a follower 90 fixed to the tool slide 69 and by which the truing tool is guided to reproduce the identical shape on the grinding wheel cutting surface 23a. If desired the operative surface of the form bar 88 may be contoured so as to generate a predetermined desired shape on the peripheral cutting surface of the wheel 23.

Fluid actuated means are provided for transversing the longitudinal slide 67, together with the tool slide and the truing tool across the cutting surface 23a comprising a traverse cylinder 92, fixed relative to the slideway 68. A traverse piston 94 is slidably mounted within the cylinder 92 and has a piston rod extending therefrom fixed to the slide 67.

The grinding machine, may not be, but is preferably provided with suitable means for maintaining a substantially constant peripheral surface speed of the cutting surface 23a on the grinding wheel 23. This can be done in various ways such as by periodically changing pulleys, or sheaves, providing devices with adjustable variable speed change sheaves or gears and, as shown, by automatically increasing the speed of the wheel drive motor M each time the radius and diameter of the grinding wheel is reduced by the truing tool 72.

The constant peripheral surface speed mechanism shown is similar to that disclosed in the above mentioned U. S. Pat. No. 2,746,214 and comprises a flexible drive shaft or cable 100 coupled at one end to the pinion drive shaft 78. The other end of the flexible shaft 100 is coupled to and drives the input shaft of a gear reducer 102 which has an output drive shaft operatively coupled to the movable contact element of a conventional rheostat 104. The conventional rheostat 104 has a variable resistance element connected into the circuit supplying electrical energy from line L1 through a switch MS to the motor M and which automatically varies the rotational speed of the motor M and the grinding wheel according to the change in radius and diameter of the grinding wheel 23.

Additionally, the grinding machine comprises wheel wear compensating means for advancing the wheel slide 20, and the feed nut 30 relative to the feed screw and the grinding wheel 23 toward the workpiece W each time the grinding wheel face 23a is dressed. The amount of each compensating movement being equal to the truing tool feed and hence the amount by which the radius R of the grinding wheel 23 is reduced by the truing tool 72. As a result the retracted position of the cutting face 23a of the grinding wheel 23 is reestablished and maintained at substantially constant distances A and C respectively from the finish dimension of the workpiece W and the axis Z—Z of the workpiece W and center of the work support means 14 and 16. Each compensating movement simultaneously changes the positions of the wheel slide 20 and the feed nut 30 relative to the base 10 and the end surface of the rapid traverse piston 36. The total amount of compensating movement of the wheel slide 20 during the life of grinding wheel 23 is predetermined by the usable radial portion R1 of the wheel which is the difference between the maximum radius R of a new full size wheel and the minimum radius R2 of the wheel which can no longer be used in that particular machine and must be replaced.

The compensating means is substantially the automatic wheel feed compensating mechanism 115 disclosed in the above mentioned U. S. Pat. No. 2,894,360 and to which reference may be had for details not disclosed herein. The wheel feed compensating mechanism 115 is mounted on the gear 51 and serves to operatively connect the gear 51 to the shaft 52 and the feed screw 24.

A worm gear 116 meshes with a worm 119 rotatably mounted on the gear 51 rotatably supported on a hub of the worm gear 116 keyed to the shaft 52. The worm 119 is operatively connected to a one way over running clutch, not shown, a train of gears 123, 124, and 124a to a compensating rack piston 127 slidably mounted in a cylinder bore in the shaft 52. A stop plunger 132 is slidably supported within a bore in the rack piston 127 and has a head or shoulder baised into engagement with an adjustable stop screw 133. The stop plunger can be shifted axially relative to the piston 127 by adjusting the stop screw 133 whereby the desired wheel feed compensating movement corresponding to the total truing tool feed can be obtained. Each time the rack piston 127 is moved by fluid under pressure into engagement with the shoulder or head of the stop plunger 132, it rotates through the gear train and the worm 119, the worm gear 116 and the shaft 52 relative to the gear 51. Thus the feed screw 24 advances the feed nut 30, wheel slide 20 and the wheel face 23a toward the axis Z—Z.

A solenoid operated directional fluid control valve V2 is provided for simultaneously directing fluid under pressure from a pipe P, connected to a conventional fluid pressure supply system, not shown, to and from the truing device 66 and the wheel feed compensating mechanism 115. Manually closing either a momentary switch TB or automatically closing a pair of contacts of a counter energizes a relay CR1 which closes its normally open contacts energizing solenoid S2. Energizing solenoid S2 shifts valve V2 and fluid under pressure goes to and actuates compensating piston 127, ratchet piston 84 which advances truing tool 72 toward axis Z—Z, and traverse piston 94 for the first or rough truing pass across the cutting face 23a and longitudinal slide 67 moves away from a normally open limit switch LS1 opening its contacts. Normally closed contacts of a limit switch LS2 holds relay CR1 and S2 energized until contacted by slide 67. Valve V2 resets allowing pistons 84 and 127 to reset under influence of springs. Fluid under pressure is now directed to actuate truing tool feed ratchet piston 82 a fine increment and to the opposite side of cylinder 92 and piston 94. Truing tool is fed a fine increment toward axis X—X and the piston 94 traverses the truing tool 72 for a second or fine truing pass before grinding of the workpiece W begins.

The single compensating movement of the piston 127 has advanced the cutting face 23a of the wheel 23 a total amount, equal to the rough and fine increments of truing tool feed, toward the axis Z—Z and the substantially constant dimensions C and A are reestablished.

Truing control means, utilized in combination with the various mechanism described above, are provided for attaining the principal object of the invention comprising counting means for automatically actuating the truing device 66 at a progressively increasing frequency in accordance with the progressively decreasing radius, diameter, and circumference of the grinding wheel during repetitive grinding operations. Thus the number of workpieces W ground by the trued cutting surface 23a decreases periodically in direct proportion to the reduction in radius, diameter, and circumference of the grinding wheel 23. The control means for actuating the truing device at increasing frequency comprises sensing means including a cam actuating cylinder 140 including a gear housing 140a adjustably fixed to the base 10 adjacent to the moveable wheel slide 20. A cam rack piston 142, with a piston rod 143 extending therefrom, is slidably mounted within the cylinder 140 and has gear or rack teeth thereon meshing with a gear 144 fixed to a shaft 146 rotatably journalled in the gear housing 140a.

A one way over running clutch mechanism 150 has an inner drive member 152 keyed and fixed to an end portion of the shaft 146, which is only diagrammatically shown, extending beyond the gear housing 140a. The inner drive member has a plurality of balls or rolls therein, resiliently baised into engagement with the internal cylindrical surface of a hub or driven member 154 of the clutch 150. Around the exterior of the hub 154 are a plurality of equally spaced teeth for engaging an axially movable spring pressed detent 156 slidably mounted in a bracket 140b fixed to the cylinder 140. The detent 156 has a V-shape portion extending between two of the teeth and adapted to ride over the teeth when the hub or driven member 154 is rotated and to retain its position when it is not being driven.

Fixed to the outer hub or driven member 154 is a cam support disk 158 on which is adjustably fixed a cam lobe or dog 160 for engaging and actuating a limit switch LS3 fixed to a bracket 140c fixed to the cylinder 140. The piston rod 143 extends through one end of the cam rack cylinder 140 and has an end thereof which is shown engaging an adjustable stop or bracket 162 fixed to and movable with the wheel slide 20.

OPERATION

As shown the wheel slide 20 is in its fully retracted position and has a new, full size, grinding wheel 23 of maximum predetermined radius R mounted thereon. All mechanisms are assumed to be preadjusted and the stop bracket 162 may be fixed so there is either a small precalculated amount of clearance or, as shown, substantially zero clearance between the bracket 162 and the end of the piston rod 143. It can be seen that as the grinding wheel 23 is reduced in radius the retracted position of the stop bracket 162 is progressively advanced toward the axis Z—Z to a position 162a at a maximum distance B that is equal to the total amount of wheel wear compensation and the corresponding radial length R1 of the usable portion of the wheel 23.

Therefore, each time the wheel is dressed the gap B between the bracket 162 and the piston rod 143 increases by the amount of each compensating movement corresponding to the reduction in the radius of the wheel 23. Likewise, the stroke of the rack piston 142 and hence the angular displacement of the gear 144, and the cam 160 is progressively increased after each successive dressing operation.

Each time a workpiece W is ground and the slide 20 is retracted, the rapid traverse piston 36 and the cylindrical sleeve 28 returns to their initial starting position. An actuation rod 164 fixed to and movable with the sleeve 28 actuates a normally open limit switch LS4 each time the wheel slide reaches its most rearward position. Closing of the contacts of limit switch LS4 energizes a time delay relay TDR which energizes the solenoid S3 of a directional control valve V3 and the count coil CC of a conventional commercially available counter 166. Both the timer T and the counter 166 may be a MICRO FLEX timer and counter manufactured by the Eagle Signal Corp., Davenport, Iowa. The time delay relay TDR transmits impulses, to the count coil CC of the counter 166, that represents the actual number of workpieces ground by the machine while the limit switch LS3 sends to the count coil CC at varying intervals of time, an additional impulse which may be considered a false count or signal since it is added by the counter but does not represent a ground workpiece. The counter has a dial and means not shown, by which it is preset to count a desired predetermined number of workpieces that the initial trued cutting surface 23a of maximum radius and circumference on a newly trued full size grinding wheel is capable of grinding before it needs to be redressed. After the count coil CC of the counter 166 receives that total preset number of actual and false impulses it actuates the truing device 66 by closing a set of normally open contacts CC1 energizing a relay CR1.

Normally open contacts of CR1 close energizing S2 and normally closed limit switch LS2 provides a holding circuit maintaining S2 energized until slide 67 opens contacts of LS2 at end of the first or rough pass of the truing cycle. Limit switch LS1 opens as slide 67 moves toward LS2 and the counter 166 resets in the well known manner. Contacts of LS2 breaks holding circuit de-energizing S2 which allows valve V2 to reset and traverse the slide 67 for the second or fine pass of the truing tool 72 across the wheel 23 to the starting position shown. Return of the slide 67 to the starting position allows contacts of LS2 to close and closes the normally open contacts of LS1 which completes a circuit from power line L1 through an on or off switch SW to energize the clutch coil CH of the counter 166. Energizing the counter 166 closes a set of its contacts to provide a holding circuit maintaining the counter operative for counting the next group of impulses produced during repetitive grinding operation. At the beginning of a repetitive grinding operation there will be less frequent additions of false signals than at the end when the useful life of the grinding wheel is about to expire and the smaller circumference of the cutting surface 23a of the wheel is incapable of grinding the initial number which the counter was preset to count.

When a workpiece is being ground contacts of LS4 are open, a de-energizing a time delay relay TDR opening its normally open contacts and closing its normally closed time delayed contacts TC, S3 is de-energized and valve V3 resets allowing fluid under pressure from conduit P to retract the cam rack piston 142, as shown, which through the gear 144 and the over running clutch 150 does not disturb the position of the cam 160.

When either the gage G or timer T controlled grinding cycle of a workpiece W is terminated actuation rod 164 closes contacts of LS4 energizing a time delay relay TDR which closes its normally open contacts and through its normally closed timed to open contacts TC energizes S3, shifting valve V3, and fluid under pressure is directed to and from the cylinder 140 so as to shift the cam rack piston 142 until the end of the piston rod 143 engages the bracket 162. Gear 144 and cam are rotated relative to the actuating roller of the limit switch LS3. After a sufficient delay of time the timed contacts TC open de-energizing S3. Valve V3 resets and cam rack piston 142 is retracted.

The proportion of workpieces W which can be ground between dressings of the surface 23a is directly proportional to the radius, diameter, and circumference of the grinding wheel.

Assuming that it has been determined that the cutting surface 23a of the largest circumference of a full size wheel rotating at a constant predetermined speed will grind 30 pieces satisfactorily and that after the grinding wheel is reduced by the radial amount R1 it is one half (½) its original size and therefore can only grind 15 pieces satisfactorily. Therefore 15 additional false pulses must be produced during the grinding of the last group of 15 pieces which added to the 15 actual pieces ground and counted, equals 30 for which the counter was preset.

Thus, the stroke of the rack piston 142 must be sufficient to reach the stop bracket 162 when it is in the extreme position 162a and therefore the stroke equals and is determined by distance B equal to R1. Therefore, the gear 144 must rotate one complete revolution for each full stroke B of the piston and the circumference of the pitch circle of the gear 144 must be equal to B and R1.

For example, when the initial diameter of a new wheel is 36 inches, R is 18 inches, and R1 is 9 inches then B and the maximum stroke of the piston 142 and the circumference of the pitch circle of the gear 144 must be 9 inches when the minimum radius R2 of the wheel is 9 inches. Assuming that each truing cycle reduces the radius R and the usable radial portion R1 of the wheel 0.005 of an inch it will take 9 ÷ 0.005 or 1,800 truing cycles to reach the minimum radius R2. When the wheel 23 is a new full size one the stroke of piston 142 is zero and therefore the cam 160 is not rotated the machine grinds 30 workpieces and the counter receives 30 impulses representing the actual number of workpieces ground and the counter actuates the first truing cycle of the wheel.

After the first truing cycle, the wheel radius is reduced 0.005 of an inch and the wheel slide 20 together with the stop bracket 162 is advanced by the compensating mechanism 0.005 of an inch from the retracted position of the piston rod 143. Upon grinding each of the next or second group of workpieces W, each stroke of the piston 142 is 0.005 of an inch. Hence each angular displacement of the gear measured along the 9 inch circumference of the pitch circle is 0.005 of an inch which multiplied by 30 strokes equals a total angular displacement of 0.150 of an inch of the pitch circle.

Converting the 0.150 of an inch angular displacement along the circumference of the 9 inch pitch circle to degrees we find that it amounts to approximately 6° or 1/60 of a 360° revolution. Each time the wheel is dressed thereafter the total movement produced by 30 strokes of the piston 142 and angular displacements of the gear and cam 160 is increased by a total of 0.150 of an inch and 6° respectively so that after the second dressing the 30 strokes and displacements of 0.010 each, equal an angular displacement of 0.300 of an inch and 12° respectively. However, adding the total movement produced by the first group of strokes and displacements to that produced by the second group we see that the grand total movement is 0.450 of an inch or 18°. Thus the cam 160 has moved a total of 18° after grinding 90 workpieces or three groups of 30 workpieces and the grinding wheel has been dressed twice and reduced 0.010 in radius thereby. After grinding 11 groups of 30 pieces each for a total of 330 workpieces and before the wheel is about to be dressed, the wheel will have been dressed 10 times, reduced in radius 0.050 of an inch, the piston 142 actuated 330 times but produced only 300 strokes for a total stroke movement of 8.250 inches and the cam 160 angularly displaced 330° from the roller of the limit switch LS3. During the grinding of the next or 12th group of workpieces W and after the 11th dressing of the wheel each stroke of piston 142 and gap B is equal to 0.055 of an inch. Therefore, a total of 13.666 additional strokes would produce an additional total movement of 0.750 of an inch and 30° of angular displacement of the cam 160 which added to the previous totals 8.250 and 330° would equal 9 inches and 360° respectively. Thus the gear 144 and the cam 160 would make slightly more than one complete revolution (1.002) and actuated the limit switch LS3 after grinding of the 14th workpiece of the 12th group of workpieces being ground. LS3 sends the additional pulse to the count coil CC of counter advancing the count to 15 and thereby subtracting one workpiece from the preset number 30 and the number 16 which would have been required to reach 30. Thus the grinding machine has actually ground 14 but the counter reads 15 and therefore only 15 more workpieces are needed to equal 30 counts whreupon the counter will actuate the truing device 66 after the machine has actually ground 29. After the 29th piece of the 12th group of workpieces has been ground and before the grinding wheel is dressed for the 12th time the grinding wheel will have ground 11 groups of 30 workpieces and 1 group of 29 or 359 workpieces for a total reduction of 0.055 of an inch in the radius R and radial portion R1.

However since the counter is set to count 30 impulses they will continue to be groups of 30 workpieces and intervening groups of 29 each time the cam makes a revolution until the radius R of the wheel is reduced 0.305 of an inch. When reduced 0.305 of an inch, a group of 30 workpieces and strokes of the piston 142 will no longer be possible since 30 × 0.305 = 9.150 inches exceeds the 9 inch circumference of the pitch circle will rotate the gear and the cam 160 more than one revolution (366°) sending the extra impulse to the count coil CC and reducing to number of workpieces ground to 29. At this point the wheel will have been dressed 61 times, ground 32 groups of 30 pieces and 30 groups of 29 for a total of 62 groups and 1,830 workpieces. Thus an average of 29.51 workpieces and strokes were produced between dressings. However, since you cannot grind or count a fraction of a workpiece the number must be a whole one, in this case either 30 or 29 but never less than 29 workpieces.

After the radius R of the wheel has been reduced 0.305 of an inch the number of workpieces ground between dressings in subsequent groups will be either 29 or 28 but never less than 28 until the radius R of the wheel has been reduced and additional 0.320 of an inch for a total reduction of 0.625 of an inch. At this point 29 workpieces can no longer be ground between dressings since a piston stroke of 0.625 inches × 29 strokes = 18.125 inches which exceeds 18 inches which divided by 9 inches of circumference of the pitch circle produces more than two revolutions of the cam. Therefore two additional impules are sent to the counter increasing the count of 30, during the time it took to grind 28 workpieces.

Thus it can be seen that the average number of workpieces is between 28 and 29 and no less than 28 workpieces ground between dressings until the total reduction in radius R of the wheel 23, the compensating movement of the wheel support and the stroke of the piston is 0.970 of an inch. At this point 28 workpieces can no longer be ground between dressings since 0.970 × 28 = 27.160 inches which exceeds 3 × 9 inches and produces three revolutions of the cam 160 and three additional impulses.

The above operations will be repeated at more frequent intervals and the number of workpieces ground during each subsequent complete revolution of the cam 160 decreases in proportion to the decrease in the radius of the grinding wheel as a result of the progressively more frequent truing of the wheel, compensation movements of the wheel slide 20, increasing the gap B, stroke of piston 142, the angular displacement of cam 160 producing more frequent revolutions of the cam 160 actuations of the limit switch LS3, additional impulses to the counter, and actuations of the truing device by the counter.

It is to be understood that the figures presented in the above example does not apply to every grinding operation or wheel. There are numerous factors and variations which must be considered such as, the size, grade, bond and grain size of the grinding wheel, type of truing tool, the amount trued off the wheel may vary and the type and amount of material to be removed from the workpiece. Therefore the applicants invention must be calibrated to the particular wheel used in the repetitive grinding operation to be performed.

It will thus be seen that there been produced by this invention apparatus in which the object set forth hereinabove together with the many practical advantages are successfully achieved. As many possible embodiments may be made of the above invention and as many changes might be made in the embodiment disclosed, it is to be understood that all matter hereinabove set forth, is to be interpreted as illustrative and limited only by the scope of the appended claims.

What is claimed is:

1. In a grinding machine having
    a base,
    a movable support on the base,
    a grinding wheel rotatably supported on the movable support and having a cutting face rotatable about and at a predetermined radius from an axis of rotation,
    drive means for rotating the grinding wheel on the movable support,
    work support means for supporting a workpiece opposite the cutting face of the grinding wheel,
    feed means for moving the movable support relative to the base and the cutting face of the grinding wheel toward the work support means to grind the workpiece to finish size and thereafter away from the work support means to a retracted position,
    truing means for dressing the cutting face on the grinding wheel whereby the radius and circumference of the grinding wheel is reduced a predetermined amount,
    compensating means for advancing the movable support and the grinding wheel relative to the base and toward the work support means the predetermined amount the radius of the grinding wheel is reduced by the truing means whereby an initial position of the cutting face of the wheel is reestablished at a substantially constant distance from the work support means and the finish size of the workpiece,
    wherein the improvement comprises:
    truing control means, responsive to changes in the retracted position and compensating movement of the movable support relative to the base by the compensating means, for periodically actuating the truing means at progressively increasing frequency in accordance with the reduction in the radius and circumference of the grinding wheel and determining the number of workpieces to be ground thereby between dressings of the cutting face by the truing means,
    said truing control means comprises:
    counting means, operatively connected to the truing means and preset for counting a desired number of impulses which represents an initial number of workpieces to be ground by the cutting surface of the wheel at the beginning of a grinding operation when the radius and circumference of the wheel is largest and for actuating the truing means for dressing the grinding wheel when the preset number of impulses are received;
    signal means, operatively connected to the counting means, for sending an impulse thereto each time a workpiece has been ground by the grinding wheel;
    sensing means, actuated each time the movable support is returned to the retracted position for determining the amount of compensating movement of the movable support relative to the base and reducting in the radius of the wheels;

switch means, operatively connected to and periodically actuated by the sensing means at progressively increasing frequency as the compensating movement increases in response to reductions in the radius of the wheel, for periodically sending an additional impulse, not representing a ground workpiece, to the counting means;

whereby the counting means is periodically advanced and reduces the number of workpieces ground by the grinding wheel in direct proportion to the reduction in the radius and circumference of the grinding wheel.

2. In a grinding machine according to claim 1 wherein the sensing means comprises:

a cylinder mounted on the base adjacent the movable support;

a rack piston with rack teeth thereon slidably mounted in the cylinder and having a stroke of movement relative to the cylinder of a length at least equal to a usable radial portion between a maximum radius of the grinding wheel and a minimum radius at which the grinding wheel is to be replaced;

a piston rod extending from the rack piston and out through one end of the cylinder and movable into engagement with the movable support in the retracted position;

a gear rotatably mounted on the cylinder and having gear teeth meshing with the rack teeth on the rack piston and a pitch circle of a circumference equal to the length of the usable radial portion of the grinding wheel;

a one way over running clutch operatively connected to and driven by the gear;

a cam operatively connected to and rotatably driven in one direction by the over running clutch relative to the switch means;

actuating means operatively connected to the cylinder for moving the rack piston relative to the cylinder and the piston rod into and out of engagement with the movable support in the retracted position;

whereby when the grinding wheel is at the minimum radius and the distance between the movable support and the piston rod is equal to the length of the usual radial portion a single stroke of the piston rotates the gear and the cam one complete revolution which actuates the switch means sending the additional impulse to the counting means, and when the radius of the wheel is between the maximum radius and the minimum radius and the distance between the movable support and the piston rod is less than the length of the usable radial portion a single stroke of the rack piston rotates the cam a part of a revolution each time the movable support is moved to the retracted position and the length of the stroke determines the number of retractions of the movable support, the number of strokes of the piston, and the number of parts of a revolution required to rotate the cam one revolution to actuate the switch means.

3. In a grinding machine according to claim 2 wherein the signal means comprises:

a limit switch actuated each time a movable support is moved to the retracted position sending the impulse to the counting means and energizing the actuating means.

4. In a grinding machine according to claim 2 wherein the actuating means comprises:

a solenoid operated fluid directional control valve for directing fluid under pressure to and from opposite ends of the cylinder and the rack piston.

5. In a grinding machine according to claim 4 wherein the actuating means further comprises:

a time delay switch connected to and energized by the limit switch and operatively connected to first energize and then de-energize the solenoid operated valve after a predetermined interval of time has elasped.

6. In a grinding machine for sequentially grinding each of a plurality of workpieces and having a base, a movable support on the base, a circular grinding wheel rotatably supported on the movable support and having a cutting face, drive means for rotating the grinding wheel, work support means for supporting each of the workpieces in turn, feed means for moving the movable support relative to the base and the cutting face of the grinding wheel toward the work support means to grind a workpiece held by said work support means;

truing means operable through a wheel dressing cycle to dress the cutting face on the grinding wheel with a resulting reduction in the radius and circumference of the grinding wheel, wherein the improvement comprises:

truing control means for effecting operation of said truing means through a wheel dressing cycle in response to the grinding of a predetermined number of workpieces by said grinding machine and for reducing the predetermined number of workpieces ground by said grinding machine between successive wheel dressing cycles as a function of a reduction in the radius and circumference of the grinding wheel.

7. In a grinding machine as set forth in claim 6 wherein said truing control means includes detector means for detecting the grinding of successive workpieces and providing an output signal in response to the grinding of each of the workpieces, signal generator means for providing an output signal upon operation of said grinding machine to grind a number of workpieces which varies as a function of variations in the radius and circumference of the grinding wheel, and counter means for receiving output signals from said detector means and signal generator means and for effecting the initiation of a wheel dressing cycle in response to the receiving of a predetermined number of output signals.

8 In a grinding machine having a base, a movable support on the base, a grinding wheel rotatably supported on the movable support and having a cutting face rotatable about and at a predetermined radius from an axis of rotation, drive means for rotating the grinding wheel on the movable support, work support means for supporting a workpiece opposite the cutting face of the grinding wheel, feed means for moving the movable support and grinding wheel toward the work support means to a finish grind position at which the workpiece is ground to a finish size and thereafter away from the work support means to a retracted position, truing means for dressing the cutting face on the movable support whereby the radius and circumference of the grinding wheel is reduced a predetermined amount with a resulting change in the finish grind position of the grinding wheel during the subsequent grinding of workpieces, wherein the improvement comprises:

truing control means for effecting periodic operation of said truing means with a frequency which varies as a function of the number of workpieces ground and variations in the finish grind position of said grinding wheel, said truing control means including first means for providing an output signal in response to the grinding of each of the workpieces in turn, second means for providing an output signal in response to the grinding of a number of workpieces which varies as a function of changes in the finish grind position of the grinding wheel, and third means for receiving output signals from said first and second means and for effecting the initiation of a wheel dressing cycle in response to the receipt of a predetermined number of output signals from said first and second means.

9. In a grinding machine according to claim 8 further including compensating means for advancing the grinding wheel relative to the base and toward the work support means by an amount equal to the amount the radius of the grinding wheel is reduced by the truing means during dressing of the grinding wheel whereby an initial position of the cutting face of the wheel is reestablished at a substantially constant distance from work support means and the finish size of the workpiece, said second means including means for providing an output signal in response to the grinding of a number of workpieces which decreases as the distance through which the grinding wheel is advanced by said compensating means increases.

* * * * *